(12) United States Patent
Sane et al.

(10) Patent No.: US 7,987,333 B2
(45) Date of Patent: Jul. 26, 2011

(54) REPROGRAMMING OF SELECT REGISTERS IN A LINKED LIST

(75) Inventors: Aniruddha Sane, Bangalore (IN); Nagesh Chatekar, Bangalore (IN); Chengfuh Jeffrey Tang, Saratoga, CA (US); Glenn Nissen, Caledon East (CA)

(73) Assignee: Broadcom Corporation, Irvine, CA (US)

( * ) Notice: Subject to any disclaimer, the term of this patent is extended or adjusted under 35 U.S.C. 154(b) by 276 days.

(21) Appl. No.: 11/051,300

(22) Filed: Feb. 4, 2005

(65) Prior Publication Data

US 2005/0174493 A1 Aug. 11, 2005

Related U.S. Application Data

(60) Provisional application No. 60/542,594, filed on Feb. 5, 2004.

(51) Int. Cl.
*G06F 13/00* (2006.01)

(52) U.S. Cl. ............ 711/170; 711/105; 345/90; 348/716
(58) Field of Classification Search .................. 711/170, 711/105; 348/716; 345/90
See application file for complete search history.

(56) References Cited

U.S. PATENT DOCUMENTS

| | | | | |
|---|---|---|---|---|
| 4,980,765 | A * | 12/1990 | Kudo et al. ................... | 348/716 |
| 5,712,652 | A * | 1/1998 | Sato et al. ........................ | 345/90 |
| 5,990,861 | A * | 11/1999 | Eckstein ........................ | 715/273 |
| 7,098,715 | B2 * | 8/2006 | Severson ........................ | 327/291 |
| 7,495,646 | B2 * | 2/2009 | Kawabe et al. ................. | 345/95 |
| 2003/0149864 | A1 * | 8/2003 | Furukawa et al. ............. | 712/228 |

* cited by examiner

*Primary Examiner* — Yong Choe
(74) *Attorney, Agent, or Firm* — McAndrews, Held & Malloy, Ltd.

(57) ABSTRACT

A system and method, for reprogramming registers without having to reprogram unchanged registers. The registers are divided into groups based on common characteristics or functions. The values for the groups that differ from the current values are written into a linked list, which is then loaded into the appropriate registers. The linked list contains information indicating the groups of registers in the linked list.

6 Claims, 4 Drawing Sheets

REPROGRAMMING OF SELECT REGISTERS IN A LINKED LIST

RELATED APPLICATIONS

This application claims priority to "REPROGRAMMING OF SELECT REGISTERS IN A LINKED LIST", U.S. Provisional Patent Application Ser. No. 60/542,594, filed on Feb. 5, 2004 by Aniruddha Sane, et al. and incorporated herein by reference for all purposes.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Video decoders decode an encoded video bit-stream. An encoder generating a compressed video bit-stream makes a number of choices for converting the video stream into a compressed video bit-stream that satisfies the quality of service and bit-rate requirements of a channel and media. The decoder uses decisions made by the encoder to decode and present pictures at the output screen with the correct frame rate at the correct times, and the correct spatial resolution.

Over 150 Programmable registers are used to provide various parameters for the display of each picture. Various ones of the programmable registers may need to be programmed for the display of each picture in the video stream. Conventional systems reprogram each of the programmable registers for each new picture. This becomes inefficient when only a portion of the registers actually change. Some picture characteristics may stay constant over a period of time, which implies that registers associated with such a characteristic may also stay constant over that period. Thus in conventional systems, in cases where registers remain unchanged, registers get reprogrammed with the same data.

Additionally, existing system utilize the host processor to reprogram the registers with the appropriate values for each picture.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Aspects of the present invention may be seen in a method for reprogramming registers in a system that has a processor and memory, and the registers are divided into groups. The system comprises a first logic that determines the groups of registers with values that changed from the current values of the registers; a second logic that allocates a block of memory for the changed groups of registers; a third logic that writes the values of the changed groups of registers into the allocated block of memory; and a fourth logic that loads the values for the changed groups of registers into the registers.

The method for reprogramming the registers comprises determining groups of registers that have values that changed from the current values of the registers; allocating a block of memory for the changed groups of registers; writing the values of the changed groups of registers into the allocated block of memory; and loading the values for the changed groups of registers into the registers.

In an embodiment of the present invention, the allocated block of memory is a linked list. In an embodiment of the present invention, the registers are grouped based on common characteristics or association with similar functionalities within the system.

These and other features and advantages of the present invention may be appreciated from a review of the following detailed description of the present invention, along with the accompanying figures in which like reference numerals refer to like parts throughout.

DETAILED DESCRIPTION OF THE INVENTION

The present invention relates generally to programming registers. More specifically, this invention relates to programmable registers in a video decoding system. Although aspects of the present invention are presented in terms of a video system, it should be understood that the present invention may be applied to other systems, and should not be restricted to video applications.

Figure 1:
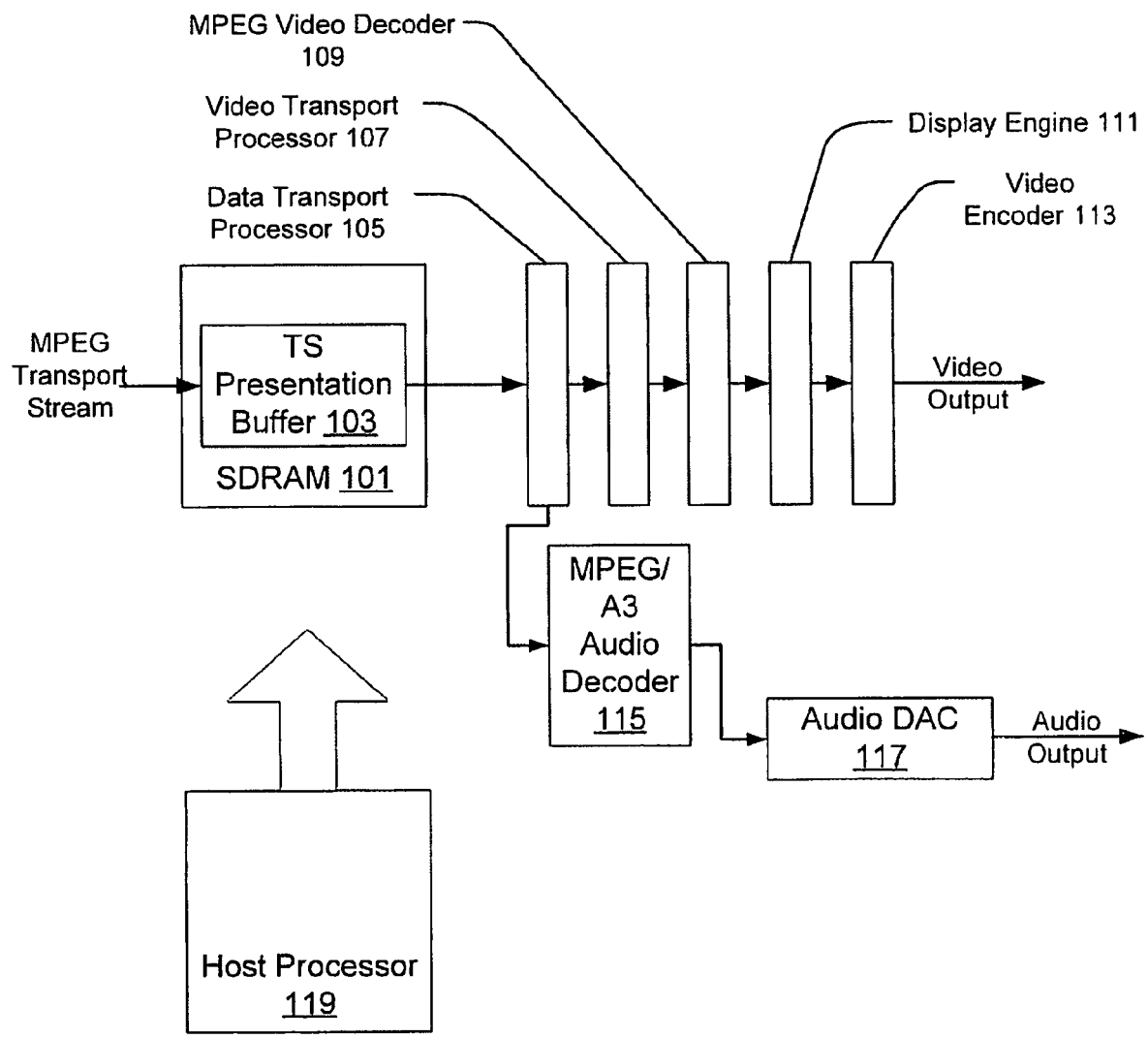
FIG. 1 illustrates a block diagram of an exemplary circuit for decoding the compressed video data, in accordance with an embodiment of the present invention.

FIG. 1 illustrates a block diagram of an exemplary circuit for decoding compressed video data, in accordance with an embodiment of the present invention. Data is received and stored in a presentation buffer 103 within a Synchronous Dynamic Random Access Memory (SDRAM) 101.

The data output from the presentation buffer 103 is then passed to a data transport processor 105. The data transport processor 105 de-multiplexes the transport stream into packetized elementary stream constituents, and passes the audio transport stream to an audio decoder 115 and the video transport stream to a video, transport processor 107 and then to a MPEG video decoder 109. The audio data is then sent to the output blocks, and the video is sent to a display engine 111.

The display engine 111 scales the video picture, renders the graphics, and constructs the complete display. Once the display is ready to be presented, it is passed to a video encoder 113 where it is converted to analog video using an internal digital to analog converter (DAC). The digital audio is converted to analog in an audio digital to analog converter (DAC) 117. The display engine 111, then displays the decoded images onto a display device, e.g. monitor, television screen, etc., at the proper time and at the correct spatial and temporal resolution.

A conventional system may utilize one processor to implement the decoder 109 and display engine 111. The decoding and display process are usually implemented as firmware in SRAM executed by a processor. The decoding process and many parts of the displaying process are very hardware-dependent. Additionally, the decoding process is computationally intense. A host processor 119 may oversee the processes associated with the different parts of the decoder.

In an embodiment of the present invention, programmable registers may be used to implement certain functions in the decoder. For example, the display engine 111 may utilize the programmable registers for graphic functions such as, for example, scaling, compositing, and blending.

In an embodiment of the present invention, a linked list may be set up in the memory and populated with the values of the reprogrammable registers for the next picture to be processed. The display engine may then load the values in the linked list to the reprogrammable registers, thus eliminating the need to use the host processor for actual programming of the registers.

In an embodiment of the present invention, there may be a set number of reprogrammable registers associated with the display characteristics of a picture. The reprogrammable registers may be divided into sub groups, where each group may contain values related to a certain function. For example, a display engine such as, for example, display engine 111 may utilize 100 reprogrammable registers for scaling, compositing, and blending of pictures. The reprogrammable registers may be categorized according to a specific characteristic or functionality, and divided into groups according to the characteristics and functionalities. For example, there may be 15 characteristics and functionalities associated with each picture, thus, the programmable registers may be grouped into 15 different groups. The groups do not necessarily have the same size. Some groups may have a few reprogrammable registers associated with them, whereas, other groups may have a large number of reprogrammable registers associated with them. In an embodiment of the present invention, the size of each group may be fixed and hard-coded in the system.

Certain characteristics may not change from one picture to another, and therefore, it may not be necessary to reprogram the registers associated with such a characteristic. In an embodiment of the present invention, the linked list may only contain the values associated with the groups of reprogrammable registers that have changed.

Figure 2:
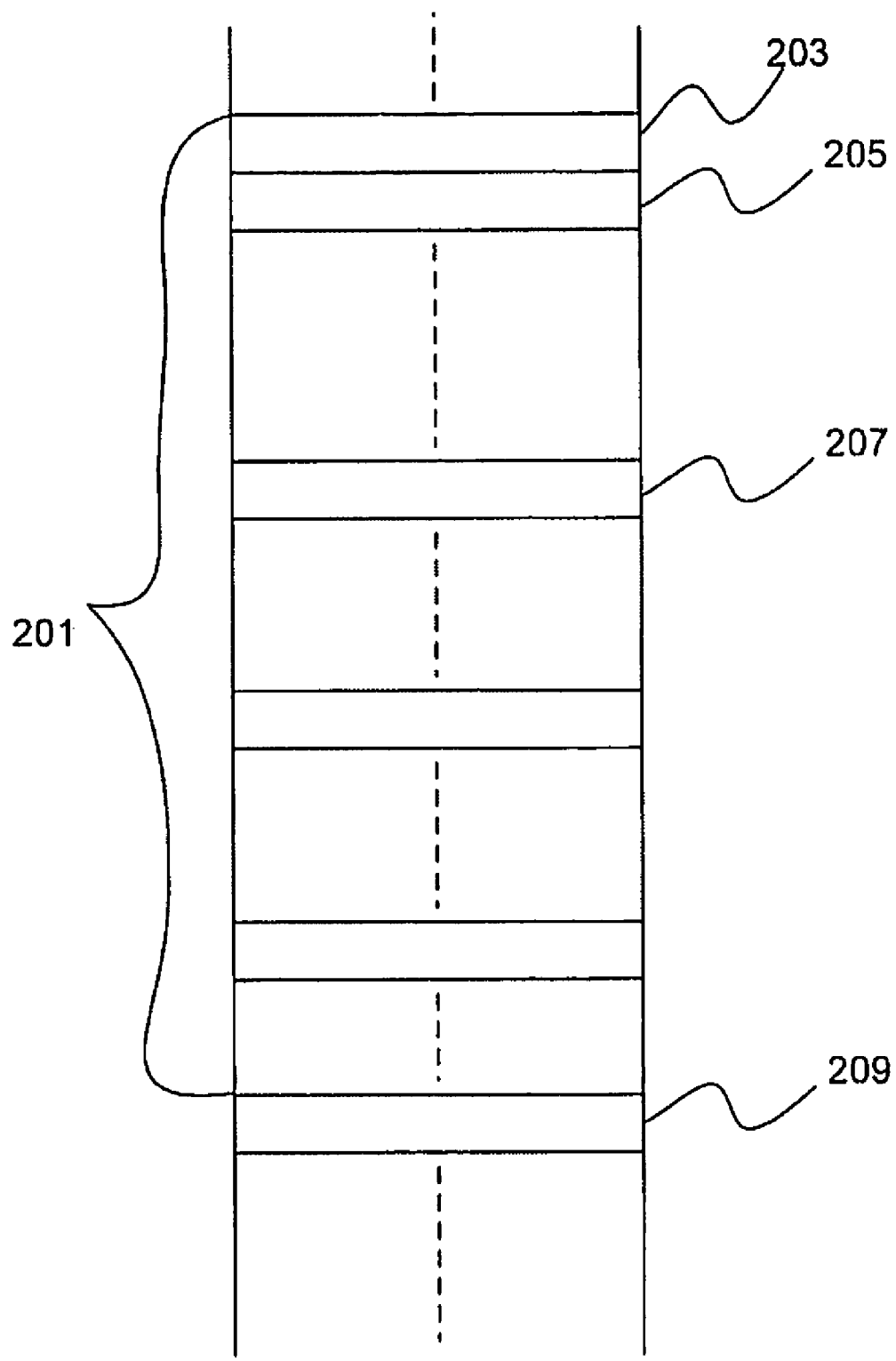
FIG. 2 illustrates an exemplary block of memory containing a linked list of values of reprogrammable registers, in accordance with an embodiment of the present invention.

FIG. 2 illustrates an exemplary block of memory containing a linked list 201 of values of reprogrammable registers, in accordance with an embodiment of the present invention. The linked list 201 may begin at a starting location 203. In an embodiment of the present invention, the first location 203 of the linked list 201 may contain information indicating which of the groups has changed and is, thus, in the linked list. For illustration purposes the 15 exemplary groups may be represented by letters of the alphabet, hence the groups may be A, B, C, D, E, F, G, H, I, J, K, L, M, N, and O. Each location of memory may comprise 16 bits. Each bit in location 203 may represent one of the groups, except one bit, for example, the most significant bit. Thus, the least significant bit may represent group A, the next bit group B, etc. If a bit is set, it may indicate that the represented group has changed and is thus contained in the linked list. If a bit is reset, it indicates that the represented group remained unchanged, and is thus not in the linked list. For example, if the first location has the following in it: 0000 1001 0100 1101, then that indicates that groups A, C, D, G, I, and L have changed. Hence, starting at the next location 205, the values associated with group A are loaded into registers represented by group A. Since the sizes of the registers' groups are fixed, the host processor only reads out the content of the locations equivalent to the size of a certain group, for example, group A, and loads them into group A registers. The processor then loads the values associated with the next group, in this example, group C, starting at the location 207 directly following the last location associated with the last loaded group, in this example, group A.

In an embodiment of the present invention, the processor stores the changed groups values in a block of memory representing the linked list. However, since the groups that change may vary from picture to picture, the size of the linked list also varies from picture to picture. Thus, the processor determines the number of locations needed for the linked list and allocates an equivalent chunk of memory of that size, plus the location 203 indicating the changed groups, and any part of memory needed for any processing may not use that allocated part of memory. Instead, the processor directs the next process to the next available location 209.

Figure 3:
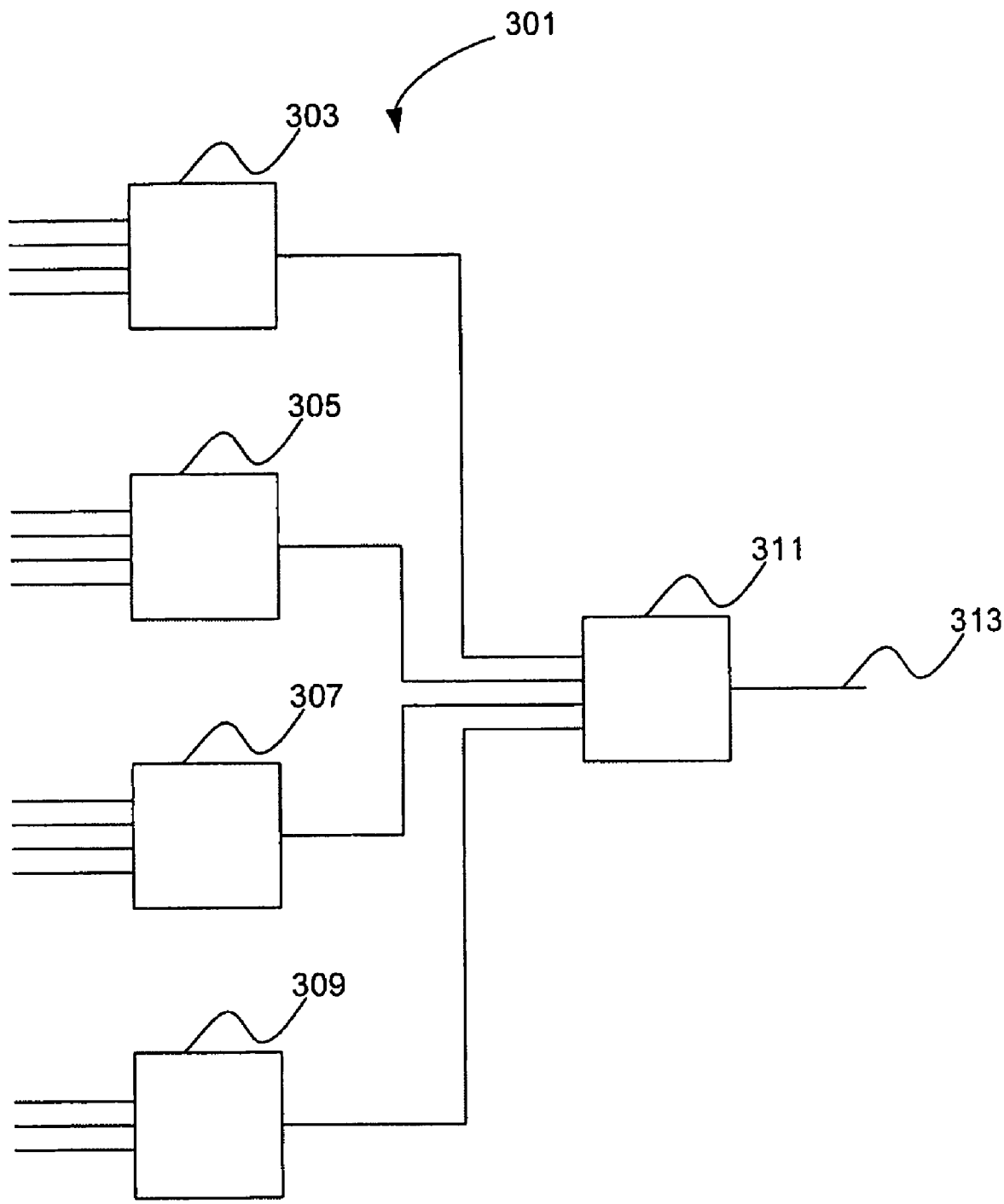
FIG. 3 illustrates a block diagram of an exemplary programmable logic that determines the number of changed groups, in accordance with an embodiment of the present invention.

FIG. 3 illustrates a block diagram of an exemplary programmable logic 301 that determines the amount of memory to be allocated for storing the registers values, in accordance with an embodiment of the present invention. The logic 301 may comprise logic components 303, 305, 307, and 309. The reprogrammable registers may be represented with, for example, 15 groups as illustrated by the example above. The inputs to the logic components 303, 305, 307, and 309 may be a signal representing each of the 15 groups. Each input signal depends on whether a certain group has changed, and will thus be included in the linked list. For example, the first input to the logic component 303 may be associated with group A. The signal is low (0) if group A registers have not changed and thus will not be included in the linked list. On the other hand, the signal is high (1) if group A registers have changed and will be included in the linked list. Since the size of each group is predetermined in the system, then if a certain group will be included in the linked list the logic component has knowledge of the size of such a group, and thus the amount of memory locations required to store the values for the registers represented by the group. Each logic component then outputs the total number of memory locations required for the groups to be represented. All output of the logic components are then added by logic component 311, and the output 313 represents the total size of memory block required for the linked list.

In an embodiment of the present invention, the logic components 303, 305, 307, and 309 may be multiplexers. In an embodiment of the present invention, the logic component 311 may be an adder.

Figure 4:
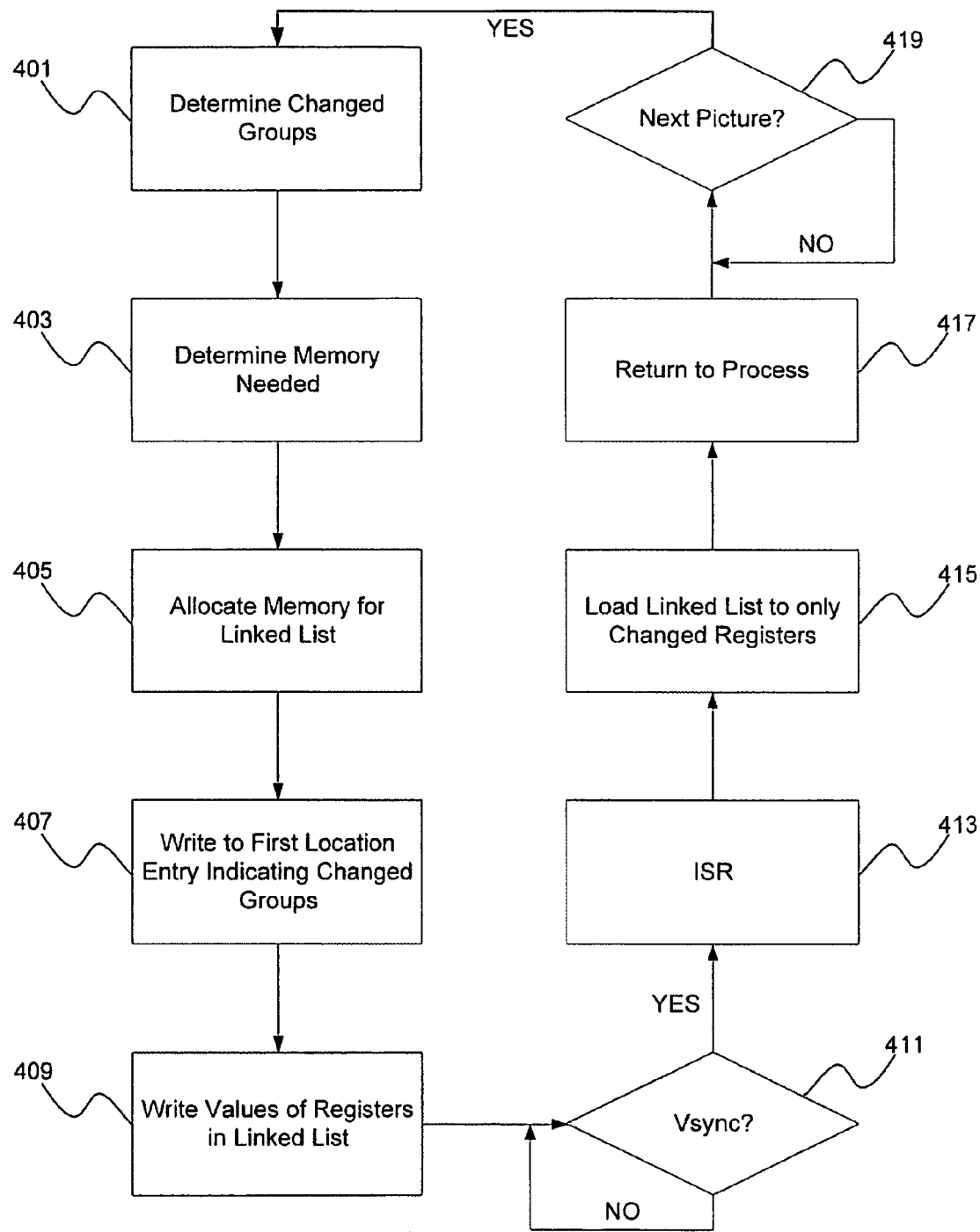
FIG. 4 illustrates a flow diagram of an exemplary method for reprogramming registers using a linked list, in accordance with an embodiment of the present invention.

FIG. 4 illustrates a flow diagram of an exemplary method for reprogramming registers using a linked list, in accordance with an embodiment of the present invention. When a new picture is being processed, the processor may, at 401, determine which groups of registers associated with the picture have changed from the last picture that was processed. The processor may then determine, at 403 using, for example, a logic such as logic 301 of FIG. 3, how much memory is required to store the values of the registers represented by the changed groups. Then at 405, memory of the required size may be allocated for a linked list to contain the values for the register, with an additional location in the beginning, which may have written to it, at 407, information indicating which groups are contained in the linked list. The processor may then write the values of the registers of the changed groups to the linked list at 409. Then, at 411, the processor may wait for a vsync to occur. When the vsync occurs, the processor goes into an interrupt subroutine (ISR) at 413. The ISR may then load the linked list into the registers that have changed, at 415. The process then leaves the ISR and resumes the process that was interrupted, at 417. The processor then resumes processing the current picture, and when a new picture comes in for processing at 419, the processor repeats the process to reprogram the register of the new picture at 401.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device with various functions implemented as firmware.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for decoding video data, said method comprising:
    determining some of a plurality of groups of registers are to be reprogrammed during one point during the display period of a frame and a remainder of the groups of registers are not to be reprogrammed at any point during the display period of the frame; and
    writing a linked list containing the values for each of the some of the plurality of groups of registers that are to be reprogrammed, wherein the values for the some of the plurality of groups of registers are continuous in said linked list;
    wherein during the display period of the frame, both even lines and odd lines are displayed;
    writing an indicator for each of the plurality of groups of registers, indicating whether each of the groups of registers are to be reprogrammed in a predetermined order; and
    wherein the linked list is in an order related to the predetermined order.

2. The method of claim 1, wherein the values in the linked list comprise varying amounts of data.

3. The method of claim 1, further comprising:
    allocating an amount of memory for the linked list;
    determining another some of a plurality of groups of registers that are to be reprogrammed and another remainder of the groups of registers are not to be reprogrammed;
    allocating another amount of memory; and
    writing another linked list containing the values for each of the some of the plurality of groups of registers that are to be reprogrammed in the memory, wherein the values for the some of the plurality of groups of registers are continuous in said linked list.

4. A system for decoding video data, said system comprising:
    a plurality of groups of registers;
    a host processor;
    a data memory; and
    a program memory for storing a plurality of instructions, wherein execution of the plurality of instructions by the processor causes:
        determining some of a plurality of groups of registers are to be reprogrammed during one point during the display period of a frame and a remainder of the groups of registers are not to be reprogrammed at any point during the display period of frame; and
        writing a linked list containing the values for each of the some of the plurality of groups of registers that are to be reprogrammed, wherein the values for the some of the plurality of groups of registers are continuous in said linked list to the data memory; and
    wherein the host processor is configured to execute the plurality of instructions after receiving a vertical synchronization pulse;
    wherein during the display period of the frame, both even lines and odd lines are displayed;
    writing an indicator for each of the plurality of groups of registers, indicating whether each of the groups of registers are to be reprogrammed in a predetermined order to the data memory; and
    wherein the linked list is in an order related to the predetermined order.

5. The system of claim 4, wherein the values in the linked list comprise varying amounts of data.

6. The system of claim 4, further comprising:
    allocating an amount of data memory for the linked list;
    determining another some of a plurality of groups of registers that are to be reprogrammed and another remainder of the groups of registers are not to be reprogrammed;
    allocating another amount of data memory; and
    writing another linked list containing the values for each of the some of the plurality of groups of registers that are to be reprogrammed in the data memory, wherein the values for the some of the plurality of groups of registers are continuous in said linked list.

* * * * *